Figure 1:
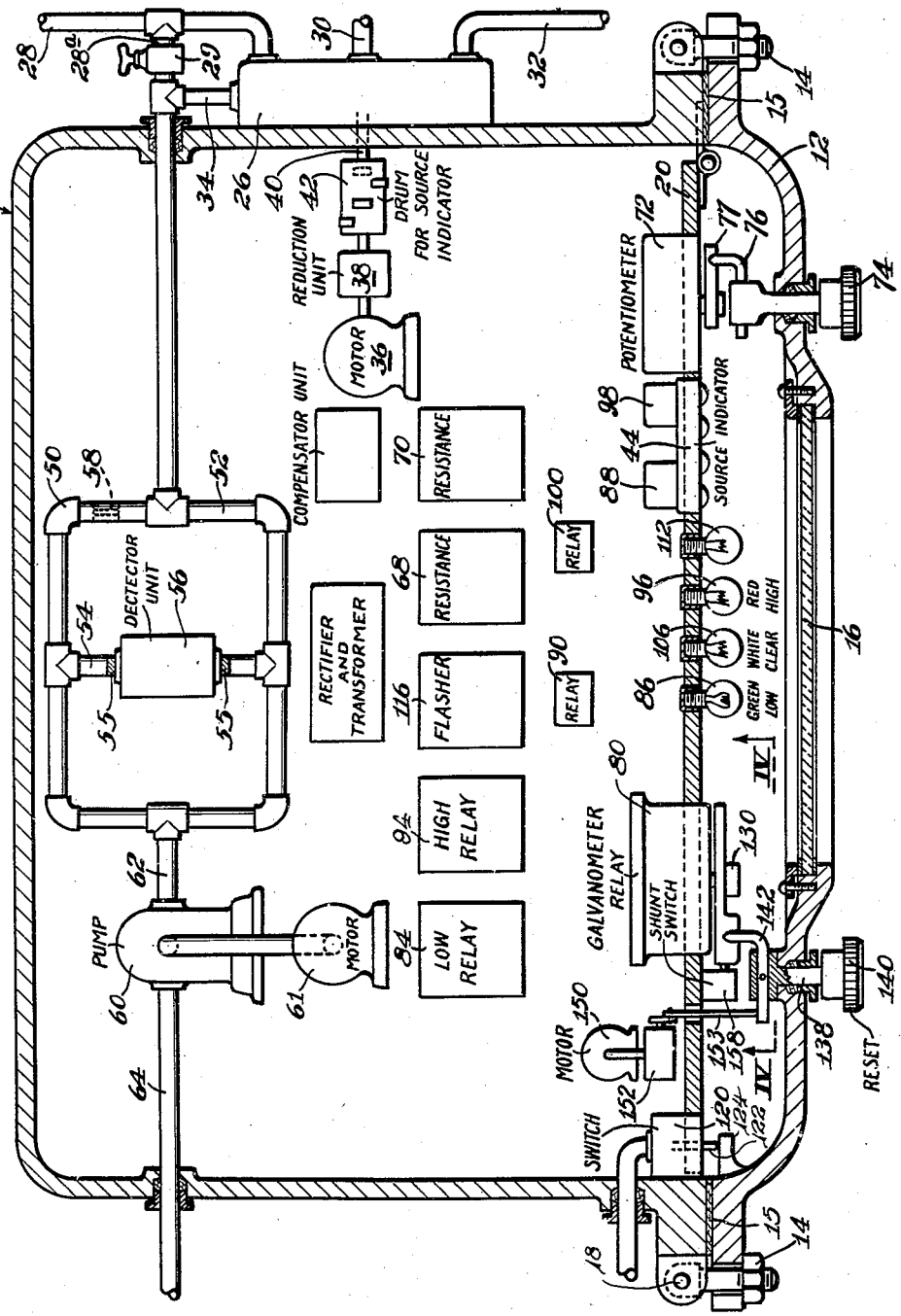

Oct. 29, 1940.   M. G. JACOBSON   2,219,391
COMBUSTIBLE GAS ALARM AND CONTROL
Filed Aug. 6, 1936   3 Sheets-Sheet 2

INVENTOR.
MOSES G. JACOBSON.
BY Frank E. Foote
ATTORNEY.

Oct. 29, 1940.　　　M. G. JACOBSON　　　2,219,391
COMBUSTIBLE GAS ALARM AND CONTROL
Filed Aug. 6, 1936　　　3 Sheets-Sheet 3
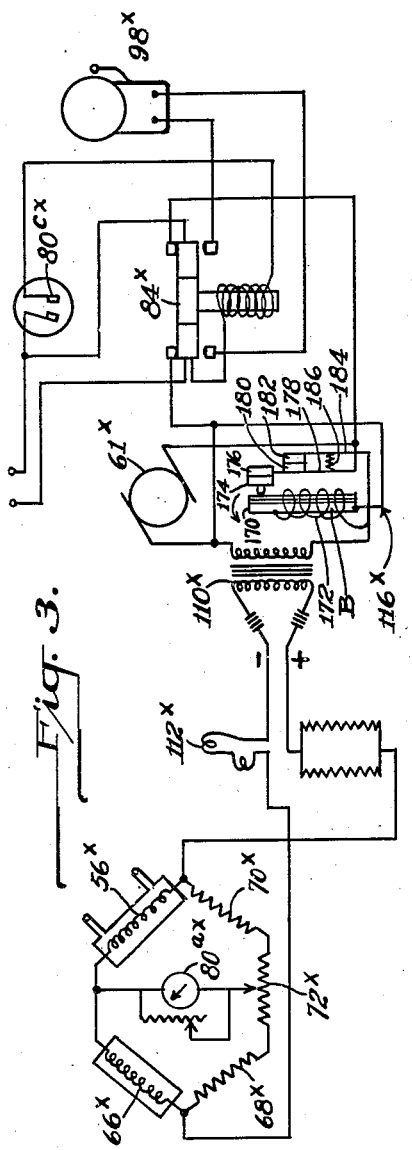
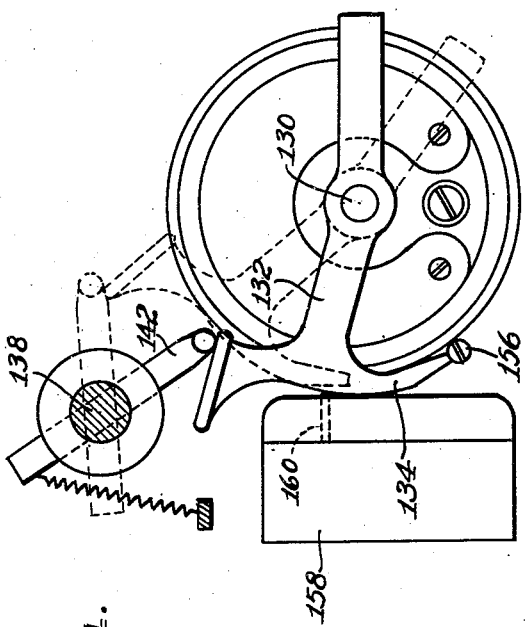
WITNESSES
AB Wallace.
HH Oldham
INVENTOR.
Moses G. Jacobson
BY Brown, Critchlow & Flick
his ATTORNEYS.

Patented Oct. 29, 1940

2,219,391

UNITED STATES PATENT OFFICE 2,219,391

COMBUSTIBLE GAS ALARM AND CONTROL

Moses G. Jacobson, Swissvale, Pa., assignor to Mine Safety Appliances Company, Pittsburgh, Pa., a corporation of Pennsylvania Application August 6, 1936, Serial No. 94,632

2 Claims. (Cl. 177—311)

This invention relates to apparatus for continuously and automatically indicating and controlling the concentration of a combustible gas or vapor between certain limits or approaching the lower explosive limit.

Heretofore apparatus of the general character indicated has been provided but this has not met with commercial acceptace to any degree because the apparatus requires too much adjustment and servicing and when left for any length of time without attention introduces in itself an explosive hazard. This is particularly true of apparatus using electrical contact-making devices as, for example, relays for starting the alarm inasmuch as the sparks of the electric contacts are a source of explosion. Further, in direct current apparatus sparks on bells, motor commutators and the like are an additional source of danger.

Moreover, known apparatus has been relatively expensive in initial and up-keep costs largely due to the necessity for repeated inspection and adjustment and because the gas-analyzing instrumentalities required frequent replacement of parts such as the electric filaments employed for igniting the gas sample. This has rendered the use of alarm devices of the character indicated substantially impossible in private homes or small businesses employing gas or oils for heating and cooking. Constant attention to and resetting of the apparatus were required, particularly if the apparatus functioned periodically to indicate a dangerous gaseous state, and thus the requirement for frequent visits by service men rendered the use of apparatus prohibitive except in large shops or mines.

It is a general object of my invention to avoid and overcome the foregoing and other difficulties of known apparatus for indicating a concentration of a combustible gas or vapor in air by the provision of improved apparatus of efficient and automatic character which is adapted to operate over long periods in an explosive atmosphere substantially without attention.

Another object of my invention is to provide combustible gas alarm and control apparatus adapted to indicate the combustible gas content of, for example, air drawn from a plurality of different sources.

A further object of my invention is to provide an electric alarm and controller of the character indicated having a sensitive electrical unit which does not have to be renewed oftener than twice a year even though the apparatus functions continuously.

Still another object of my invention is the provision of automatic or semi-automatic mechanism for resetting galvanometer or other relays incorporated in the apparatus.

The foregoing and other objects of my invention are achieved by apparatus including a vapor or explosion-proof case, a pump in the case with means for connecting the pump to any of a plurality of sources of gas so that gas is drawn through a flow system in the case and expelled to a safe gas-exhausting atmosphere. Incorporated in the apparatus and mounted in the case is an electrical Wheatstone bridge including a pair of electric filaments with means controllable outside the case for balancing the Wheatstone bridge. The gas is conducted by the pump and flow system around at least one of the electric filaments to burn any combustible material in the gas and thereby heat the filament and unbalance the Wheatstone bridge. The unbalancing of the Wheatstone bridge operates a galvanometer relay which is reset by automatic means or by hand means operable from outside the case. Electrically connected with the galvanometer realy are means for visibly or audibly indicating the combustible gas content as being undesirable. The indicating means may include a relay operating a ventilator motor, gas valve, siren or other mechanism as will be understood.

Further incorporated in the apparatus are flasher or blinker means for periodically supplying electric current to the Wheatstone bridge and the included electric filaments. By merely supplying electric current to the Wheatstone bridge for a period of say five to ten seconds out of every minute the life of the electric filaments is considerably prolonged. I also include in my combination a vapor or explosion-proof cover removably secured to the case with means operable upon opening of the cover to break all flow of electric current to the case. I likewise often include power means for continually rotating the multiple valve inlet to the case so that different portions of gas from a plurality of gas sources and also from a source of pure air are drawn through the apparatus.

Figure 2:
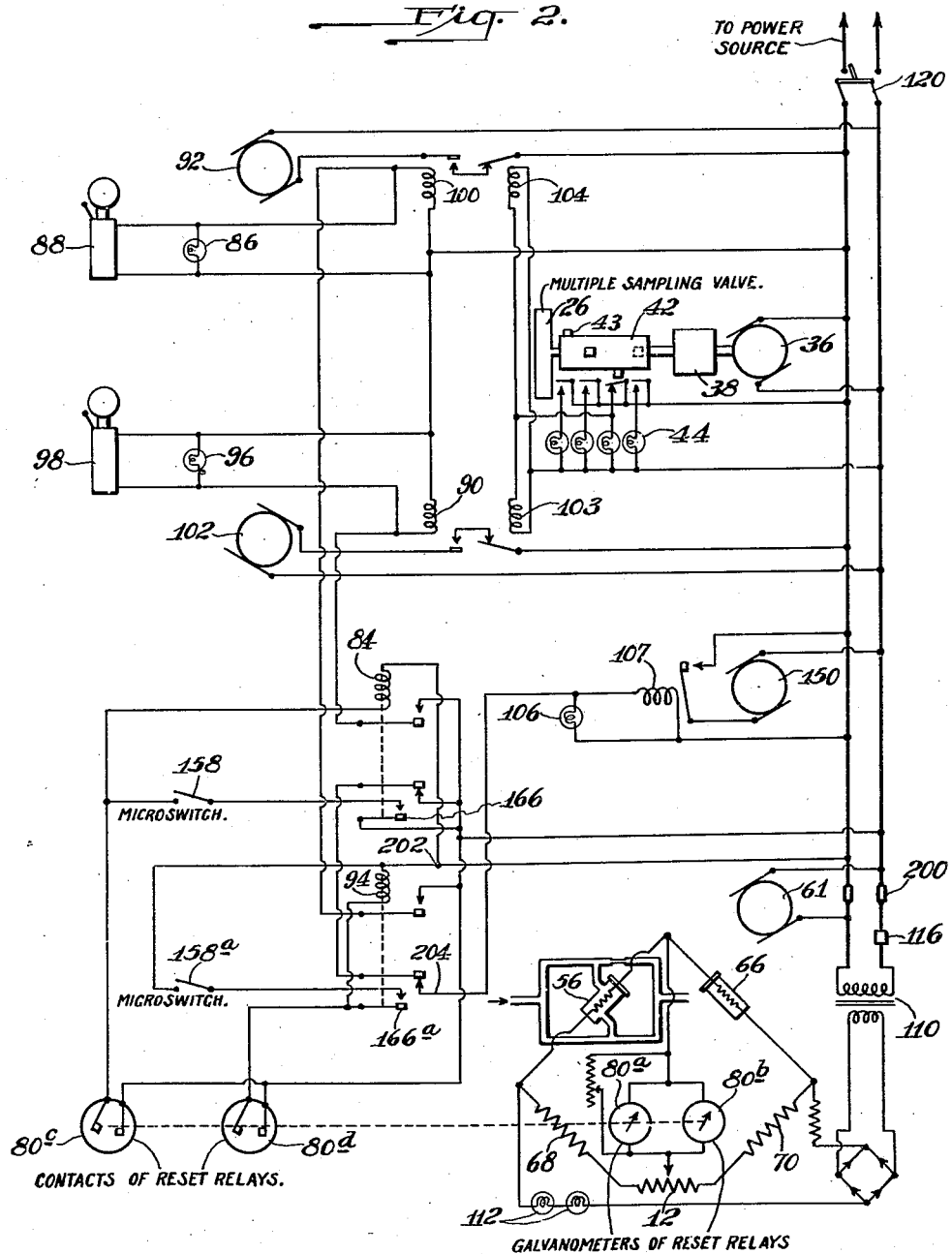

Referring to the accompanying drawings, Fig. 1 illustrates a horizontal cross-sectional view through a typical embodiment of my invention with the various parts contained in the case being illustrated diagrammatically for the purpose of clearness; Fig. 2 is an electric wiring diagram of the apparatus shown in Fig. 1; Fig. 3 is an electric wiring diagram of a modified form of my invention; and Fig. 4 is a side elevation partly in section of one embodiment of resetting mechanism for the galvanometer relay incorporated in the apparatus.

In the embodiment of my invention illustrated diagrammatically in Fig. 1 and electrically connected in Fig. 2, the numeral 10 indicates a case of light, strong metal such as cast aluminum which I term a vapor-proof case. The case is vapor-proof because it is rendered absolutely air-tight so that the various mechanisms positioned inside of the case can operate in a manner hereinafter more fully described without causing any danger of an explosion if the apparatus is employed in a gaseous medium of explosive nature. Specifically the case 10 is generally rectangular in shape and is provided with a removable cover 12 which is secured to the case proper by bolts 14 with an interposed gasket 15 rendering the connection between the case and its cover completely air-tight. In certain instances it may be advisable to dispense with the gasket and employ ground and polished metal meeting faces between the case 10 and cover 12 in accordance with fire underwriters' requirements on this type of equipment. This type of case in the trade is termed an explosion-proof case. The cover is formed with a gas-tight and/or explosion-proof window 16 so that certain indicating means positioned within the case can be observed. Hinged as at 18 in the front of the case 10 and spaced in substantially parallel relation to the cover 12 is a panel 20 which carries certain of the instrumentalties incorporated in the case.

While my apparatus is, of course, capable of testing the combustible gas content of any particular gas source, it is specifically adapted to continuously test gas from a plurality of sources. To this end, on one end of the case 10 I mount a multiple valve 26 which includes any number of conduits 28, 30 and 32 extending to individual and particular gas sources which may be at rather widely separated distances from each other. Extending from the multiple valve 26 is a conduit 34 which is passed into the case 10 in gas-tight relation therewith and which is adapted to be connected to any one of the conduits 28, 30, and 32 dependent upon the position of the multiple valve 26.

In employing the multiple valve 26 with the apparatus of my invention I have found it advisable to connect at least one of the conduits 28, 30, or 32 with a source of pure air so that adjusting of the apparatus to a zero position is facilitated. Furthermore, I preferably provide a by-pass between the pure air conduit and the conduit 34 whereby a desired amount of pure air can be led into the gas sample which is necessary in certain instances where there is a deficiency of oxygen in the sample which prevents the combustible matter therein from burning in the detector unit 56. Specifically illustrating this feature of my invention, I have illustrated a by-pass conduit 28a between the conduit 28 and the conduit 34 with an adjustable valve 29 controlling the flow of pure air from the conduit 28 to the conduit 34 and thereby mixing any desired portion of air with a sample of gas drawn through conduit 30 or 32. In some cases of industrial control of gaseous atmospheres in place of mixing air or oxygen to the sample through the by-pass conduit 28a it is advantageous to add a neutral gas such as nitrogen or carbon dioxide to the sample to decrease its combustibility by dilution and thus prolong the life of the platinum detector units.

The position of the multiple valve 26 can be controlled by hand but I preferably provide a motor 36 operating through a reduction gear box 38 to drive shaft 40 of the multiple valve whereby the conduit 34 extending to the inside of case 10 is connected for any desired period such as one-quarter to two minutes wtih the conduits 28, 30, and 32 in turn. The particular gas source to which the conduit 34 is connected through multiple valve 26 is indicated by suitable means positioned on the panel 20 in front of window 16. Preferably I provide a contact drum 42 upon the shaft 40 operating the multiple valve 26 which operates switches 43 connected as shown in Fig. 2 to a plurality of lights 44 so that the position of the valve 26 and the gas source is indicated at all times by the source indicator 44 which, as stated, is positioned directly behind the window 16.

The conduit 34 extending into the case 10 is connected to a flow system that might be termed a gaseous Wheatstone bridge including two branches 50 and 52 connected by a bridge stream 54 carrying a detector unit 56 of a type illustrated in my Patent No. 2,010,995, granted August 13, 1935. This flow system is described in detail and claimed in my co-pending application Serial No. 58,683 of January 15, 1936. On both sides of the detector units suitable flashback arresters 55 are inserted. I preferably provide an orifice 58 in one of the branches 50 or 52, as, for example, branch 50, as illustrated in the drawings, so that during flow of combustible gas through the gaseous Wheatstone bridge a certain flow of gas through the detector unit 56 occurs. The exact amount of flow is determined by the size of the orifice 58 which may be made adjustable. A pump 60 driven by motor 61 is connected to the gaseous Wheatstone bridge by a conduit 62 and exhausts the gas through a conduit 64 which extends through the case 10 in gas-tight relation to any suitably safe gas-exhausting station.

As electrically illustrated in Fig. 2, the detector 56 includes an electric filament forming a part of an electric Wheatstone bridge. The other members of the bridge comprise a compensator unit 66 identical with the detector unit 56 except that the compensator unit is usually sealed or is inactive to ignite the combustible gas, whereas the combustible gas being tested is constantly circulated through the detector unit and burnt as will be understood. Resistances 68 and 70 together with a potentiometer rheostat 72 complete the Wheatstone bridge. The potentiometer rheostat 72 is mounted on the panel 20 and is operable from outside of the casing 10 by means of a knob shaft 74 which is provided with a finger 76 removably engaging an arm 77 on the end of the potentiometer rheostat shaft. By this construction the cover 12 of the case 10 can be removed or replaced without interfering with the connection whereby the potentiometer rheostat can be operated from outside of the case. The potentiometer rheostat, of course, balances the Wheatstone bridge as will be understood by those skilled in the art.

Electrically connected across the Wheatstone bridge and adapted to indicate any unbalancing of the bridge is a reset galvanometer relay 80 which may be of any known type as, for example, that sold under the trade-name "Weston Sensitrol." The galvanometer relay may be of the single type for indicating solely an over-concentration of combustible gas, but in the embodiment of the invention illustrated in Figs. 1 and 2

I employ a dual or double galvanometer relay ordinarily in the form of two single-acting galvanometer relays with one adapted to respond to an over-concentration and the other an under-concentration of combustible material in the gas tested.

As seen in Fig. 2, the reset galvanometer relays, indicated as a whole by the numeral 80 in Fig. 1, include oppositely acting galvanometers 80a and 80b connected across the Wheatstone bridge. The galvanometers, dependent of course upon whether the combustible gas content of the gas tested is too high or too low, operate associated switches 80c and 80d which are electrically connected as illustrated. The galvanometers and switches of the galvanometer relays are shown separately in Fig. 2 for the purpose of making the circuit diagram clearer whereas in reality they constitute one complete instrument.

If the switch 80c is closed by galvanometer 80a, indicating a deficiency of combustible gas in the gas tested, a relay 84 is operated to energize an audible or visible signal, or both. In the embodiment of the invention illustrated the relay 84 is electrically connected to the galvanometer relay as illustrated in Fig. 2 and functions to light a green light 86 mounted on the panel 20 behind the window 16 of the cover 12. This, of course, indicates to the operator that the combustible gas content of the gas tested is below a certain minimum. In addition to operating the light 86 a bell or other alarm device 88 producing audible signals may likewise be energized. Furthermore, I contemplate operating a relay 90 which can be adapted to control the flow of electric current to a ventilating motor, or to a motor operated or electrically controlled means to increase the fuel or air supply, or to means functioning to shut down a furnace, close a gas line, etc. In order to simplify the wiring diagram the relay 90 has been indicated as merely operating a motor 92 which is adapted to perform any of the functions stated or any desired function ordinarily effecting a correction of the deficiency indicated.

If the combustible gas content of the gas source tested becomes dangerously high, the gas ignited in the detector unit 56 unbalances the Wheatstone bridge in the opposite electrical direction to cause galvanometer 80b to close switch 80d which is electrically connected through a relay 94, as shown in Fig. 2, to provide an audible or visible signal, or both. Specifically, a red light 96 mounted on the panel 20 behind the window 16 of the cover 20 may be operated and a bell or other audible alarm means 98 may be electrically connected as shown in Fig. 2 to be operated. I further contemplate the provision of a relay 100 which controls the flow of current to a ventilating fan, means for closing or opening a gas line, furnace or the like, so that any desired corrective means can be started or gas-producing means stopped automatically. In Fig. 2 I have shown the relay as controlling the operation of a motor 102 in order to simplify the representation of this phase of my invention. It should be understood that the motors 92 and 102 and the bells 88 and 98 are positioned outside of the case 10 of my apparatus but that the relays 90 and 100 are ordinarily positioned within the case as shown in Fig. 1. However, the relays 90 and 100 and any other parts of the apparatus may be grouped together in a second vapor or explosion-proof case as will be understood.

Since in the form of the invention illustrated and described the gas tested is drawn from any one of a plurality of sources, it may be advisable to adapt the apparatus to energize electrical means, such as means 92 and 102, at more than one point dependent upon the source of the gas tested. To this end relays operable by the position of the valve 26 to connect the control mechanism with the electrical means associated with the particular gas source may be incorporated in the apparatus. For the purpose of clearness only two such additional relays 103 and 104 have been illustrated in the wiring diagram, it being understood, however, that each of the switches 43 may be connected to relays of the same type whereby the position of the drum 42 controls the operation of a particular set of relays connecting particular electrical means, such as means 92 and 102, with the relays 90 and 100 of the control mechanism.

When the galvanometer relays are not unbalanced by either too high or too low a flow of combustible gas, I provide means for indicating this condition of the apparatus which preferably includes a clear bulb 106 electrically connected to the galvanometer relays as shown in Fig. 2. The bulb 106 is ordinarily mounted upon the panel 20 behind the window 16 of the cover 12 so that it can be readily observed by the operator. However, this light or any of the other signal lights may be positioned at some distance from the apparatus, for instance, in a superintendent's office or on a switchboard. A relay 107 may be connected in parallel with the bulb 106 to perform any desired operation while the gas concentration is normal and the bulb 106 is lit, and to stop this operation and to start another operation when the concentration becomes abnormal and the bulb 106 is extinguished.

Completing the description of the apparatus illustrated in Figs. 1 and 2, the numeral 110 indicates a combined transformer and rectifying unit which is electrically connected as illustrated to provide a constant flow of rectified electrical current to the Wheatstone bridge. Pilot lamps 112 are ordinarily incorporated in the electrical circuit to indicate that the Wheatstone bridge circuit is properly operating. These pilot lights are usually mounted on the panel 20 behind the window 16 so as to be visible to the operator.

An important part of this invention is the provision of a blinker or flasher mechanism 116 in the electric circuit extending to the Wheatstone bridge. The flasher mechanism comprises any suitable means adapted to supply a flow of electric current to the Wheatstone bridge only for a periodically repeated fractional part of the operating time of the apparatus, as, for example, for a period of from about five to about ten seconds out of every minute. Since flasher mechanism of this general character is well known, I will not describe it in detail in conjunction with this embodiment of my invention. Suffice it to say that when the flasher mechanism is employed in the circuit the filaments of the detector unit 56 and the compensator 66 are burned only a relatively small percentage of their actual operating time so that the life of these units is materially prolonged. This feature is of utmost practical importance when it is realized that it has always been the practice to continuously burn the filaments which has so shortened their lives that replacement is necessary at frequent intervals. By the use of flasher mechanism of the character and in the combination described I have materially increased the life of the essential feature of the gas alarm apparatus and have thereby adapted it for use in residences, small hotels and businesses where the expense of constant filament replacement and servicing attention has heretofore rendered its use unsatisfactory.

Another important part of this invention is the provision of a switch 120 in the case 10 adjacent the cover 12 which switch controls the flow of electric current to the interior of the case and which opens the line so that no current can flow to the interior of the case when the cover is moved away from the case more than about .003" which is the extent of an explosion-retaining gap. The switch 120 is of the micro-operating type, i. e., adapted to be opened or closed by very small movements and is normally held closed by the engagement of the switch-operating plunger 122 with a lug 124 formed on the cover of the case. Thus all danger of explosions due to electric sparking in the case is removed by providing an explosion-proof case having a removable cover which upon removal opens a microswitch controlling the flow of all electric current to the interior of the case. While for simplicity no relay has been shown, it may be found advisable in practice to have the microswitch 120 operate a relay to control all flow of electric current to the case 10.

The galvanometer relay or relays 80 incorporated in the apparatus are of the reset type. That is, it or they must be reset after the associated switch is closed because the switch stays closed until the galvanometer relay is reset. I may employ either hand or automatic means for resetting, and in the form of the invention illustrated both types of resetting mechanism have been indicated. Specifically, as illustrated in Fig. 1 and Fig. 4, each galvanometer relay includes a resetting shaft 130 which carries an arm 132. One end of the arm 132 is formed with an upstanding flange 134. With the arm 132 in the dotted position illustrated the galvanometer relay is in a position where the associated switch is closed. When the arm 132 is in the full-line position, the galvanometer relay is in its reset or normal operating position.

In order to move the arm 132 from the dotted to the full-line position shown in Fig. 4, the hand means I provide include a shaft 138 journaled in gas-tight relation with the cover 12 and carrying an operating knob 140 at its outer end. At the inner end of the shaft 138 is secured a finger 142 which, as illustrated in Fig. 4, is movable into engagement with the flange 134 of the arm 132 so that twisting of the knob 140 moves the arm 132 from the dotted to the full-line position to reset the galvanometer relay. When two galvanometer relays are used as described, the shaft 138 is spaced an equal distance from both and functions to operate each in turn through duplicate mechanism.

I likewise provide automatic means for periodically resetting the relay, and in the form of the invention illustrated these means may include a motor 150 which is electrically connected in the circuit as shown in Fig. 2. More specifically, the motor 150 is started directly or by the relay 107 whenever the galvanometer relay has been caused to make contact by an abnormal gas concentration. Thus the automatic resetting motor 150 operates only when the white light 106 is out and either the green light 86 or the red light 96 on. The motor 150 is connected to the shaft 130 of the galvanometer relay through a reduction gear box 152. The gear box includes a crank arm 153 periodically movable into engagement with the finger 142 to move it to turn the arm 132 from the dotted to the full-line or reset position. Ordinarily, the drive from the motor 150 through the reduction gear box 152 resets the galvanometer relay about every one half to two minutes, although it should be understood that this automatic resetting operation can be made at more or less frequent intervals.

The hand reset for the galvanometer relays is employed when the flasher mechanism 116 is used since otherwise the motors 92 or 102 would stop and start repeatedly after once being started because either the switch 80c or 80d would be opened by the automatic resetting and closed unless the gas condition were corrected. I may, however, use time delay relays for the relays 84 and 94 to thereby keep the motors 92 and 102 going even though a flasher 116 is employed in conjunction with automatic resetting mechanism.

I have found it advantageous to incorporate microswitches 158 and 158a with the resetting mechanism for the galvanometer relays 80, each switch, as electrically illustrated, when closed shunting out the switches 80c and 80d so that in the resetting operation there is no opening spark between the contact points when the relay is reset. This use of a shunting microswitch materially reduces burning and corrosion of the small switches 80c and 80d and greatly increases the life of the galvanometer relay. Another and more important function of this arrangement is in self-regulating installations to prevent stopping of the regulating motor 92 or 102 and also of the resetting motor 150 when the galvanometer relay switch 80c or 80d is opened by the resetting action but the gas concentration is still too improper so that the switch 80c or 80d will be closed again immediately after the resetting is complete.

As shown in Fig. 4, the flange 134 of the resetting mechanism is in the nature of an arcuate cam and engages with the operating plunger 160 of the microswitch 158 at the start of the resetting movement of the arm 132 and maintains the switch closed until the resetting movement of the arm is substantially completed, at which time the switch opens. Only one microswitch and galvanometer relay have been illustrated in Figs. 1 and 4 to simplify the showing. However, as heretofore described, the finger 142 may act to reset a pair of galvanometer relays with associated microswitches. In order to prevent the closing of a microswitch 158 or 158a from shunting the switch 80c or 80d which was not closed by the combustible gas content, each of the relays 84 and 94 may be provided with extra single throw switch contacts 166 and 166a connected in series with the shunting microswitches as shown in Fig. 2 so that even though both galvanometer relays are reset only the one which responded to the gas concentration is shunted during resetting. For example, if switch 80d is closed by galvanometer 80b because of too high a gas concentration, the resetting motor 150 resets both switches 80c and 80d. However, only relay 94 is energized at the start of the resetting so that contacts 166 are open and microswitch 158 can never shunt switch 80c. Microswitch 158a is capable of shunting switch 80d for the purpose stated because contacts 166a are closed to connect the microswitch in the circuit.

As above stated, instead of shunting microswitches and resetting apparatus I may employ time-delay relays in place of the relays 84 and 94 so that resetting of the galvanometer relays 80 does not immediately open the relays 84 and 94 which would cause stopping and starting of the motors 92 and 102, lights 86 and 96, etc., which is undesirable when the combustible gas concentration has not been corrected.

It will be seen from Fig. 1 that the galvanometer relay 80 can be reset by hand from outside of the explosion-proof case 10 without removing the cover 12. This feature is highly advantageous if an automatic resetting mechanism is not employed.

An important feature of my invention, when automatic resetting is not employed, is the provision of means for automatically shutting off all flow of electric current to the electrical Wheatstone bridge and pump motor 61, whenever a galvanometer relay has been actuated to start an alarm, a ventilating fan, etc.: from the time the galvanometer relay has carried out its function until it is reset there would be no useful purpose accomplished by running of the pump and burning of gas on the detector units. Therefore, shutting off the current for the periods when the alarm or ventilator is on—which periods may be quite long in the absence of automatic control—will effect a considerable saving especially in the life of the detector filaments. In the embodiment of the invention shown in Fig. 2 this feature may be achieved by connecting the junction point 200 to the contact 204 on relay 94, as shown by dotted lines, instead of to the junction point 202. The dotted line connection just described puts the motor 61 and transformer and rectifier 110 in parallel with light 106, so that they are switched off whenever this light goes out, that is when either relay 94 or relay 84 are actuated.

In the embodiment of my invention illustrated in Fig. 3, the dual-purpose galvanometer relay (really two galvanometer relays in Figs. 1 and 2) has been replaced by a single-acting galvanometer relay. Likewise the many features of automatic control and relay operation and the like have been eliminated as has the case 10 for the purpose of simplifying the illustration of this modification. Because of the similarity between the parts of the embodiment of my invention shown in Fig. 3 and various devices of the form of the invention illustrated in Figs. 1 and 2 and above described, like parts have been indicated by the same numerals but the suffix $x$ has been added to the parts of Fig. 3.

Referring particularly to Fig. 3, the galvanometer relay 80$x$ is of the single-acting type including a galvanometer 80a$x$ and a switch 80c$x$. A single relay 84$x$ is employed in place of the several relays of the embodiment of the invention first described, and with the relay electrically connected with the galvanometer relay in the manner shown in Fig. 3, closing the switch 80c$x$ by the galvanometer 80a$x$ functions to energize bell 96$x$ and also breaks all flow of electric current to the electrical Wheatstone bridge, pump motor 61$x$, etc.

In Fig. 3 I have also illustrated a particular form of flasher mechanism indicated as a whole by the numeral 116$x$ and including a bimetallic strip 170 which is surrounded by a heater coil 172 and which is provided with an adjustable button 174 normally in contact with a button 176 carried by a spring arm 178. Supported on the spring arm 178 is a contact 180 which engages with a contact 182 mounted on a support 184 with a resistance 186 being electrically connected with the support 184 and spring arm 178. With the parts electrically connected as illustrated the flasher mechanism functions to periodically make and break the electrical connection to the combined rectifier and transformer 110$x$ in the manner heretofore generally described.

Heating of the bimetallic strip 170 by the coil 172 causes movement of the strip in the direction shown by the arrow to break contacts 180 and 182. Breaking of the contacts causes the current going to the transformer to pass the high resistance 186 and thus to decrease the amount of electrical energy transmitted to the rectifier and the measuring Wheatstone bridge circuit to a very small amount. In the same time, the current through the heater coil 172 of the bimetallic strip, which is connected in parallel to the transformer primary, is also substantially decreased; the strip cools off and moves back to the right until contacts 180 and 182 are closed again and the full current through the transformer is reestablished. By this mechanism the filaments of the Wheatstone bridge are energized for say from five to about ten seconds out of every minute.

The simplified mechanism shown in Fig. 3 can, of course, be employed with any of the features of the form of my invention shown in Figs. 1 and 2, as, for example, the multiple valve for drawing gas from various sources, and, of course, the potentiometer control, the resetting mechanism and any relay-operated motors, warning lights or the like, can be readily included in the electrical and operating combination. The switch for breaking the flow of electric current to the apparatus inside of the case 10 when the case is opened is, of course, included in the combination. Likewise, in the form of the invention shown in Figs. 1 and 2 the single-acting galvanometer relay may be employed. These and other modifications, substitutions and correlations will be apparent dependent upon the particular job to which the apparatus must be adapted and are well within the skill of the ordinary mechanic in view of the teaching herein, and hence will not be described in detail.

Both of the wiring diagrams disclosed indicate the use of alternating current. It should be understood, however, that I contemplate the use of direct current with little or no change in the wiring diagram with the exception of the use of the transformers. In addition, when direct current is employed I preferably place the interrupter element of a D. C. bell in the case 10 since the sparking action of the bell is dangerous in an explosive atmosphere. The interrupter element can be connected in series with an alternating current bell which may be placed outside of the case to provide an audible alarm.

It is believed the operation of the apparatus will be understood from the foregoing description. The apparatus is adapted for use over long periods with little or no inspection or part replacement. The apparatus is substantially light but is fool- and explosion-proof. It can be adapted to raise an alarm by audible signal means or can likewise be arranged as described to perform any desired compensating action, as, for example, the starting of a ventilating motor. The apparatus is adapted to be used in mines, factories, hotels, oil refineries, gas plants, garages and the like wherever dangerous conditions of combustible content in gas may possibly arise. Substantially any type of alarm or control operation desired can be obtained and the principles herein disclosed are easily applicable to provide very simple or relatively complicated apparatus as required.

While in accordance with the patent statutes two forms of my invention have been illustrated and described in detail, it should be appreciated that my invention is not limited thereto or thereby, but is defined in the appended claims.

I claim:

1. In a self-contained combustible gas alarm and control apparatus, the combination of a vapor-proof case, a hermetically sealed flow system in said case for passing gas to be tested therethrough, electrical means within said case for determining by combustion an undesirable amount of combustible material in said gas, a reset relay disposed within said case and controlled by said electrical means for indicating the presence of an undesirable amount of combustible material in said gas, and means associated within said case with said reset relay and operable from outside the case for resetting said relay after it has been actuated by a predetermined amount of said combustible material, said elements cooperating to provide indication of the presence of an undesired amount of combustible material present in the gas and to avoid explosion interiorly and exteriorly of said case upon their actuation and operation.

2. In a self-contained combustible gas alarm and control apparatus, the combination of a vapor-proof case, an electric Wheatstone bridge disposed within said case including a pair of electric filaments, means disposed within said case controllable from the outside thereof for balancing said bridge, hermetically sealed means disposed within said case for conducting a gas sample around at least one of said filaments to burn combustible material in said gas and thereby heat the filament and unbalance said bridge, a reset galvanometer relay disposed within said case for operation upon unbalancing of said bridge, means associated with said relay within said case and operable from the outside thereof for resetting the relay and means operatively connected to said relay for indicating an undesirable amount of combustible material in the gas, said elements cooperating to provide indication of the presence of an undesired amount of combustible material present in the gas and to avoid explosion interiorly and exteriorly of said case upon their actuation and operation.

MOSES G. JACOBSON.